United States Patent
Weiss et al.

(10) Patent No.: US 6,741,600 B1
(45) Date of Patent: May 25, 2004

(54) RAPID CALL ESTABLISHMENT IN ATM RINGS

(75) Inventors: Jeffrey Weiss, Lincoln, RI (US); Ming-Teh Ma, Newton, MA (US); Bappa Sinha, Brighton, MA (US); William J. Regan, Groton, MA (US); Ed Klein, Holliston, MA (US); Christopher James White, N. Chelmsford, MA (US)

(73) Assignee: Omnia Communications, Inc., Marlborough, MA (US)

( * ) Notice: Subject to any disclaimer, the term of this patent is extended or adjusted under 35 U.S.C. 154(b) by 0 days.

(21) Appl. No.: 09/344,845

(22) Filed: Jun. 28, 1999

(51) Int. Cl.7 .............................................. H04L 12/28
(52) U.S. Cl. ...................... 370/404; 370/395.2; 370/432
(58) Field of Search ................................. 370/258, 254, 370/404, 458, 461, 401, 405, 406, 402, 403, 400, 452, 395.51, 57, 432, 390, 395.5, 539, 541; 709/227

(56) References Cited

U.S. PATENT DOCUMENTS

| | | | | |
|---|---|---|---|---|
| 5,490,138 A | * | 2/1996 | Niestegge et al. | 370/399 |
| 5,600,795 A | * | 2/1997 | Du | 370/397 |
| 6,192,054 B1 | * | 2/2001 | Chan et al. | 370/452 |

OTHER PUBLICATIONS

Method for Introducing Switched Virtual Connection Call Redundancy in Asynchronous Transfer Mode Networks, Henry L. Fourie, Chung–Hung Lau, Jan. 12, 1999, p. 2.*

* cited by examiner

Primary Examiner—Frank Duong
Assistant Examiner—Melanie Jagannathan
(74) Attorney, Agent, or Firm—Michael R. Cammarata; David L. Soltz; Daniel M. Daisak

(57) ABSTRACT

A unidirectional ring operates in accordance with a call setup procedure in which a single node on the ring, referred to herein as the "hub node," simultaneously (i) processes call setup information from and provides call setup information to an ATM network, and (ii) controls the call setup operations of the nodes on the ring. When a source node that is part of the ring initiates a call, the node directs a call setup message to the hub node. The hub node determines if there is sufficient bandwidth available on the ring for the call. If so, the hub node passes the call setup message to the ATM network, and simultaneously multicasts call setup information to the nodes on the ring. While the call setup message is progressing over the ATM network in a conventional manner, the nodes on the ring simultaneously set up the associated virtual path and/or virtual circuit and send back connection information to the hub node. The hub node monitors the connection information to ensure that the connection over the ring is established. If the call is ultimately rejected by the destination node, the hub node multicasts to the nodes on the ring an instruction directing them to tear down the associated virtual circuit and/or virtual path. When the hub node receives a call setup message which is directed to a destination node that is a ring node, the hub node determines if there is sufficient bandwidth available on the ring to handle the call. If so, the hub node sends an appropriate acknowledgment message back to the node that sent the message to the ring. The hub node also multicasts call setup information to the nodes on the ring, instructing them simultaneously to set up a virtual circuit and/or virtual path for the call. If the destination node rejects the call, the hub node sends an appropriate call rejection message over the network to the source node and instructs the ring nodes to tear down the associated virtual circuit and/or virtual path.

25 Claims, 5 Drawing Sheets

RAPID CALL ESTABLISHMENT IN ATM RINGS

BACKGROUND OF THE INVENTION

Communications between source and destination nodes over ATM systems, or networks, require end-to-end virtual circuits and/or virtual paths. To establish the virtual circuits and virtual paths, network nodes that are to be included therein exchange a series of call setup and acknowledgment messages. The source node, that is, the node that initiates the call on the network, sends over the ATM network a call setup message that identifies the intended destination for the call and the requirements of the connection, such as quality of service, and so forth. The ATM network then forwards the call setup message hop-by-hop, that is, node-by-node, over the network to the node that communicates directly with the destination, that is, to the destination node.

When a node receives a call setup message, the node determines if it can handle the call based on the connection requirements specified in the message. If the node cannot handle the call, the node returns a rejection message. Otherwise, the node sends an appropriate acknowledgment message back to the previous node on the route, and forwards the call setup message to a next node on the route. The call setup message continues through the nodes on the route until it reaches the destination node, which forwards call setup information to the intended destination station, as appropriate. If the destination node accepts the call, the destination node sends a connect message back along the route to the source node. The source node then sends a connection acknowledgment message to the destination node, to establish the end-to-end connection.

The call setup operation requires that each included node individually (i) process the call setup message, (ii) send back to the previous node an appropriate acknowledgment message to indicate receipt of the call setup message, and (iii) forward the call setup message to the next node. Accordingly, the time it takes to establish the call depends directly on the number of nodes included in the connection.

Recently, SONET rings have been incorporated into ATM systems, such that traffic in the form of ATM cells and frames can be sent over the ring. In a ring-based network, traffic between two nodes on the ring is routed over a primary ring and, if a failure should occur in a primary ring, the traffic is re-routed over a secondary ring. If the routes are over redundant rings, which pass traffic simultaneously in opposite directions, the system is commonly referred to as a "unidirectional ring."

When a destination node or a source node is on the unidirectional SONET ring, the associated virtual path includes all of the nodes on the ring. Accordingly, each node on the ring must separately processes the call setup message, and the time to establish the connection is correspondingly lengthened by the number of nodes on the ring.

SUMMARY OF THE INVENTION

An improved SONET or ATM ring operates in accordance with a call setup procedure in which a single node on the ring, referred to herein as the "hub node," simultaneously (i) processes network call setup information from and provides call setup information to the network, and (ii) controls the call setup operations of the nodes on the ring. An end-to-end connection which includes an end node that is on the ring can thus be established over the ring in the time it takes to include the hub node and the end node in the connection, regardless of the number of nodes on the ring.

More specifically, when a call originates from a source node that is on the ring, the node directs a call setup message to the hub node. The hub node then acknowledges receipt of the call set up message and determines if there is sufficient bandwidth available on the ring for the call. If so, the hub node passes the call setup message to the ATM network, and simultaneously multicasts call setup information to each of the nodes on the ring. While the call setup message is progressing over the ATM network in a conventional manner, the nodes on the ring simultaneously set up the associated virtual path and/or virtual circuit over the ring and send back connection information to the hub node. If one or more of the ring nodes do not respond to the call setup information, the hub node may retry the call set up and/or initiate ring protection switching, as appropriate.

When the hub node receives a call acknowledgment message or a message indicating that the call has been rejected, the hub node forwards the message over the ring to the source node. If the call has been rejected, the hub node also multicasts an instruction to all of the nodes on the ring, directing them to tear down the associated virtual circuit and/or virtual path. If the call has instead been accepted, the source node establishes the end-to-end connection by sending a connect acknowledgment message to the destination node.

When the hub node receives a call setup message that is directed to a destination node which is part of the ring, the hub node determines if there is sufficient bandwidth available on the ring to handle the call. If so, the hub node sends an appropriate acknowledgment message back to the previous node on the route and forwards the call setup message to the destination node. The hub node also multicasts call setup information to all of the nodes on the ring, instructing them simultaneously to set up a virtual circuit and/or virtual path for the call.

In response to the instructions from the hub node, the ring nodes establish the associated virtual circuit and/or virtual path. If the destination node ultimately rejects the call, the hub node sends an appropriate call rejection message over the network to the source node and instructs the ring nodes to tear down the associated virtual circuit and/or virtual path. Otherwise, the destination node sends back a call acknowledgement message to the source node and the nodes on the ring participate in the end-to-end connection. All of the ring nodes are thus included in the connection in essentially the time it takes to include the hub node and end node.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
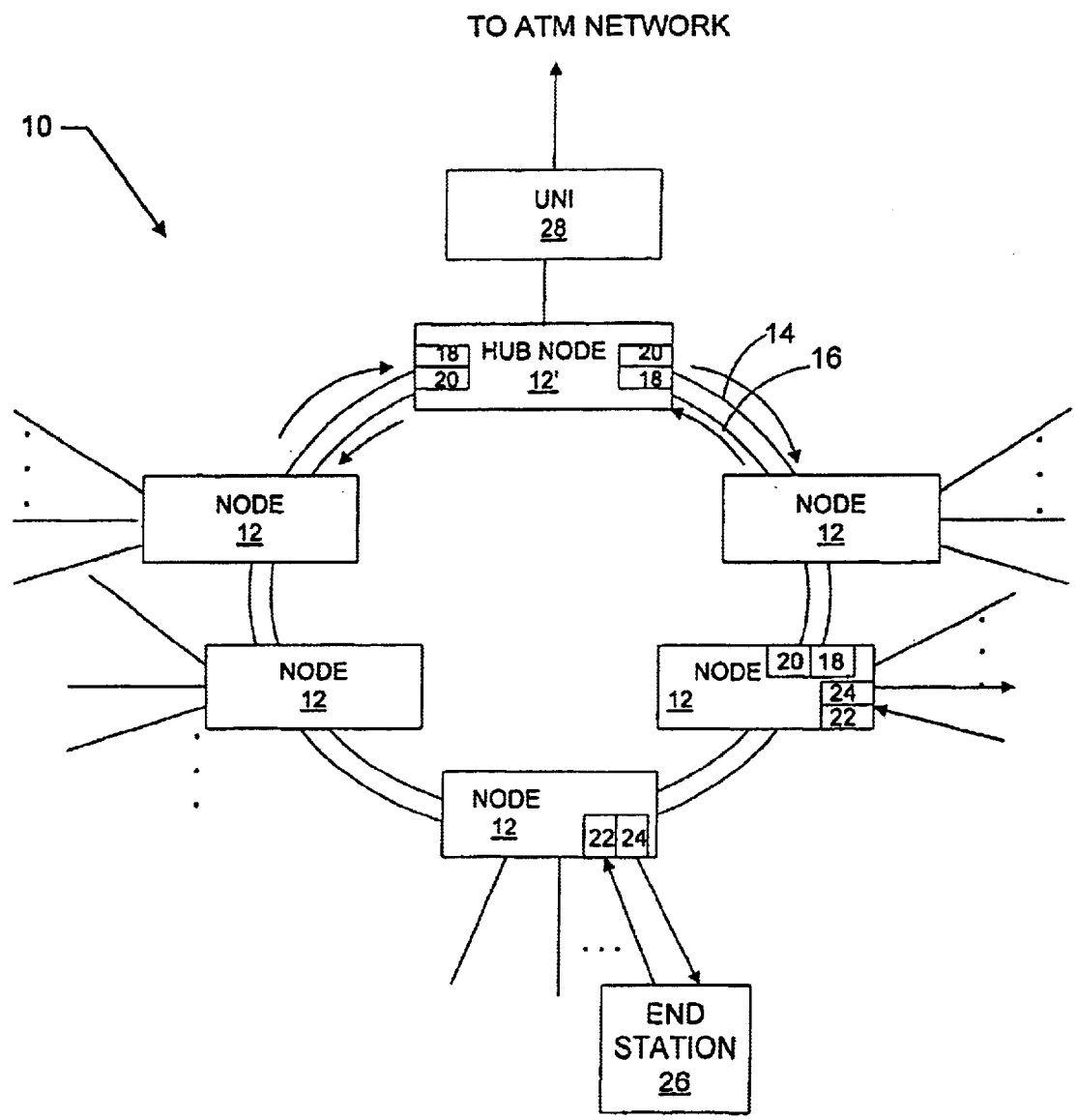
FIG. 1 is a functional block diagram of a ring-based system that operates in accordance with the invention.

Referring now to FIG. 1, a system 10 that may be included in an ATM network consists essentially of a plurality of nodes 12 that are interconnected by a primary ring 14 and a secondary ring 16. The system 10 may, for example, be a unidirectional SONET ring, with information in the form of ATM cells and frames transmitted simultaneously in both directions over the primary and secondary rings.

Each node 12 receives information over the rings 14 and 16 through incoming ports 18 and sends information over the rings through destination ports 20. The nodes 12 may also connect to various other systems (not shown) and to end stations 26 through other incoming and destination ports 22 and 24. One of the nodes 12' controls ring operations and, as indicated in the drawing, is referred to herein as the "hub node." The hub node 12' depicted in the drawing connects the system 10 to an ATM network through a conventional Network-Network Interface (NNI) or, as depicted in the drawing, a conventional User-Network Interface (UNI) 28, each of which operate in accordance with known ATM Forum Specifications. Any node on the ring may, at any given time, operate as the hub node.

Figure 2A:
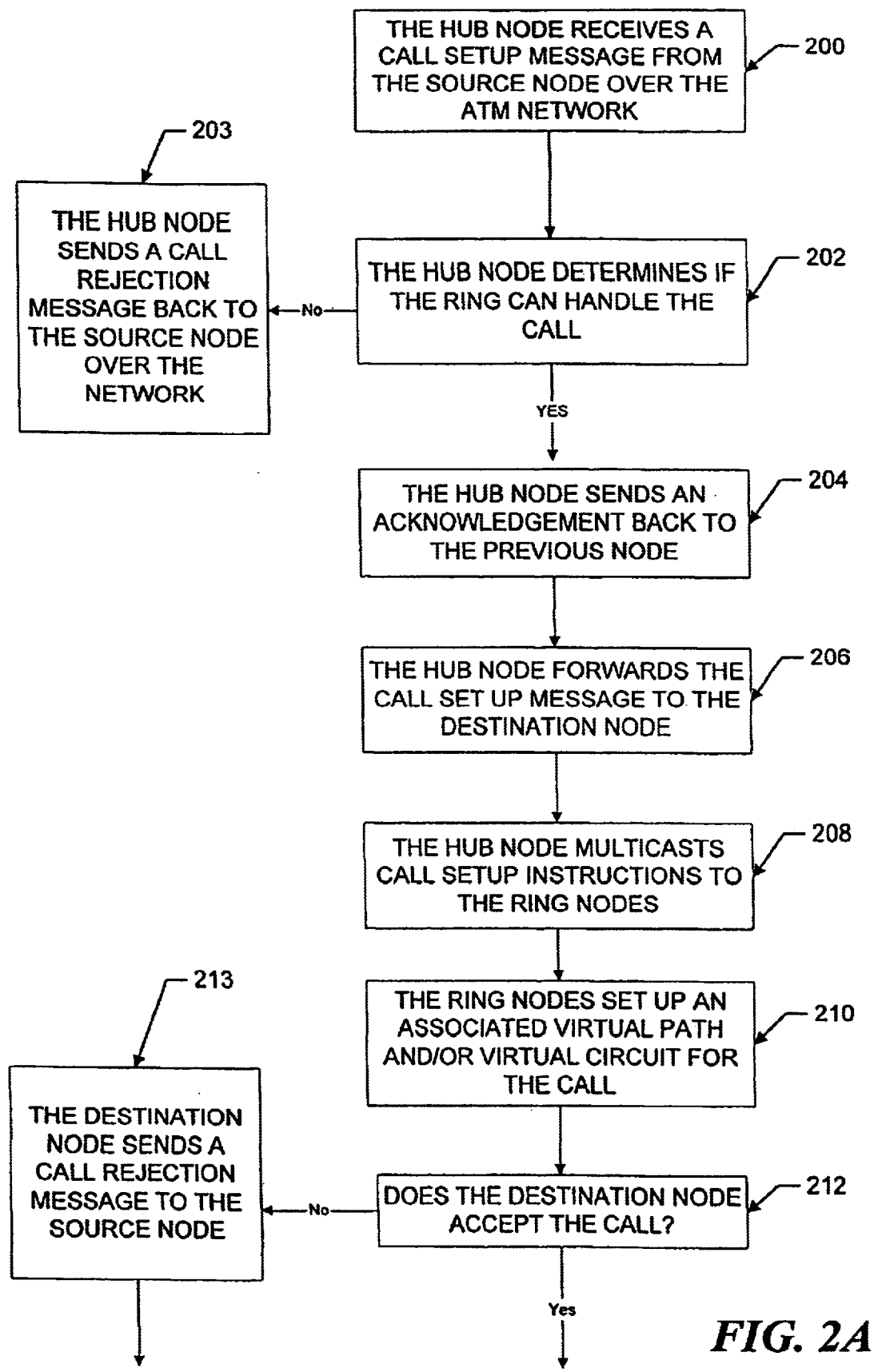
FIG. 2 is a flowchart of the operations of the system in setting up a call to a destination station that is connected to the ring.
Figure 2B:
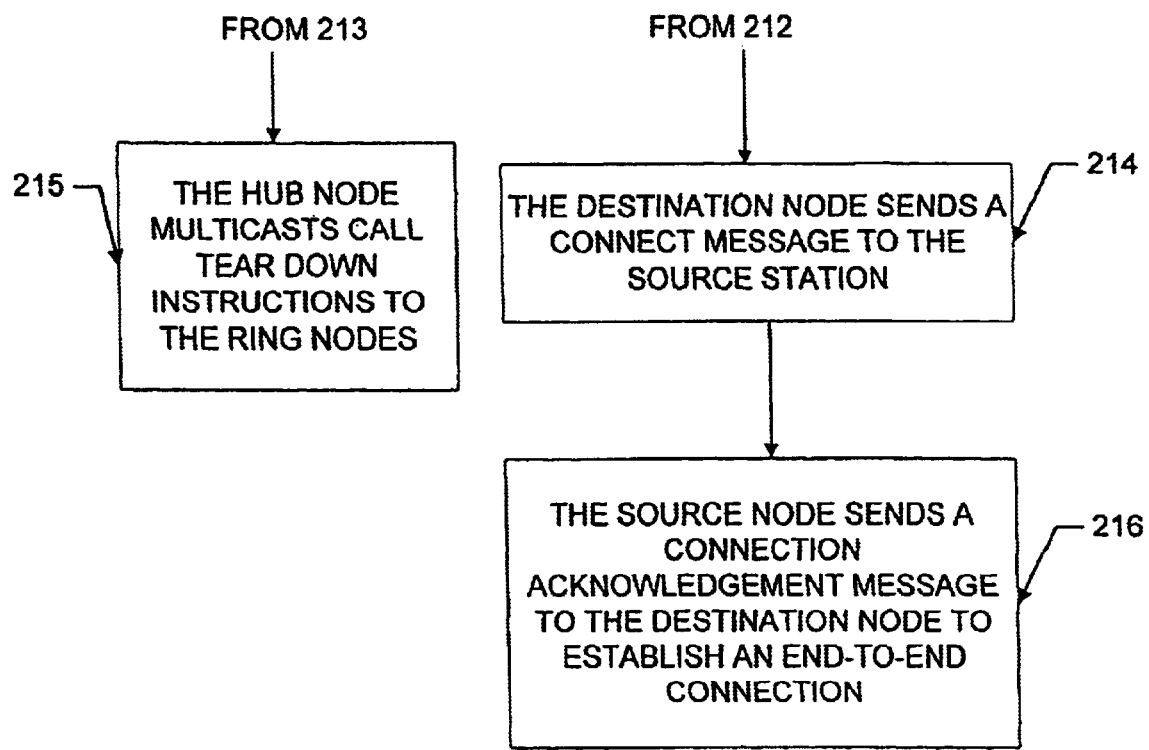

Referring also to FIG. 2, when a call is directed to a destination node that is part of the ring, the hub node 12' receives a conventional call setup message from a source node through the UNI 28 (step 200). The hub node then determines if the ring can handle the call (step 202). The hub node thus consults a data base that includes the existing calls over the ring and determines if there is sufficient available bandwidth to handle the bandwidth requirements specified in the call setup message. If the available bandwidth is insufficient, the hub node sends an appropriate rejection message back to the source node (step 203).

If sufficient bandwidth is available, the hub node 12' sends an acknowledgment message back to the previous node and forwards the call setup message to the destination node (steps 204, 206). The hub node 12' also multicasts call setup information to the ring nodes 12, to direct the nodes to establish a virtual circuit and/or virtual path for the call (step 208). The ring nodes 12 then simultaneously set up the virtual circuit and/or virtual path through their incoming and destination ports 18 and 20 (step 210).

If the destination node accepts the call, the node returns a connect message to the source node (steps 212, 214). When the hub node 12' later receives a connection acknowledgment message from the source node through the UNI 28, the hub node forwards the message directly to the destination node (step 216). The end-to-end connection is thus established without requiring each ring node 12 to individually and in turn process the call setup message.

If the destination node ultimately rejects the call, the node returns an appropriate call rejection message to the source station (steps 212, 213). The hub node then sends to the ring nodes 12 an instruction to tear down the associated virtual circuit and/or virtual path (step 215).

Figure 3A:
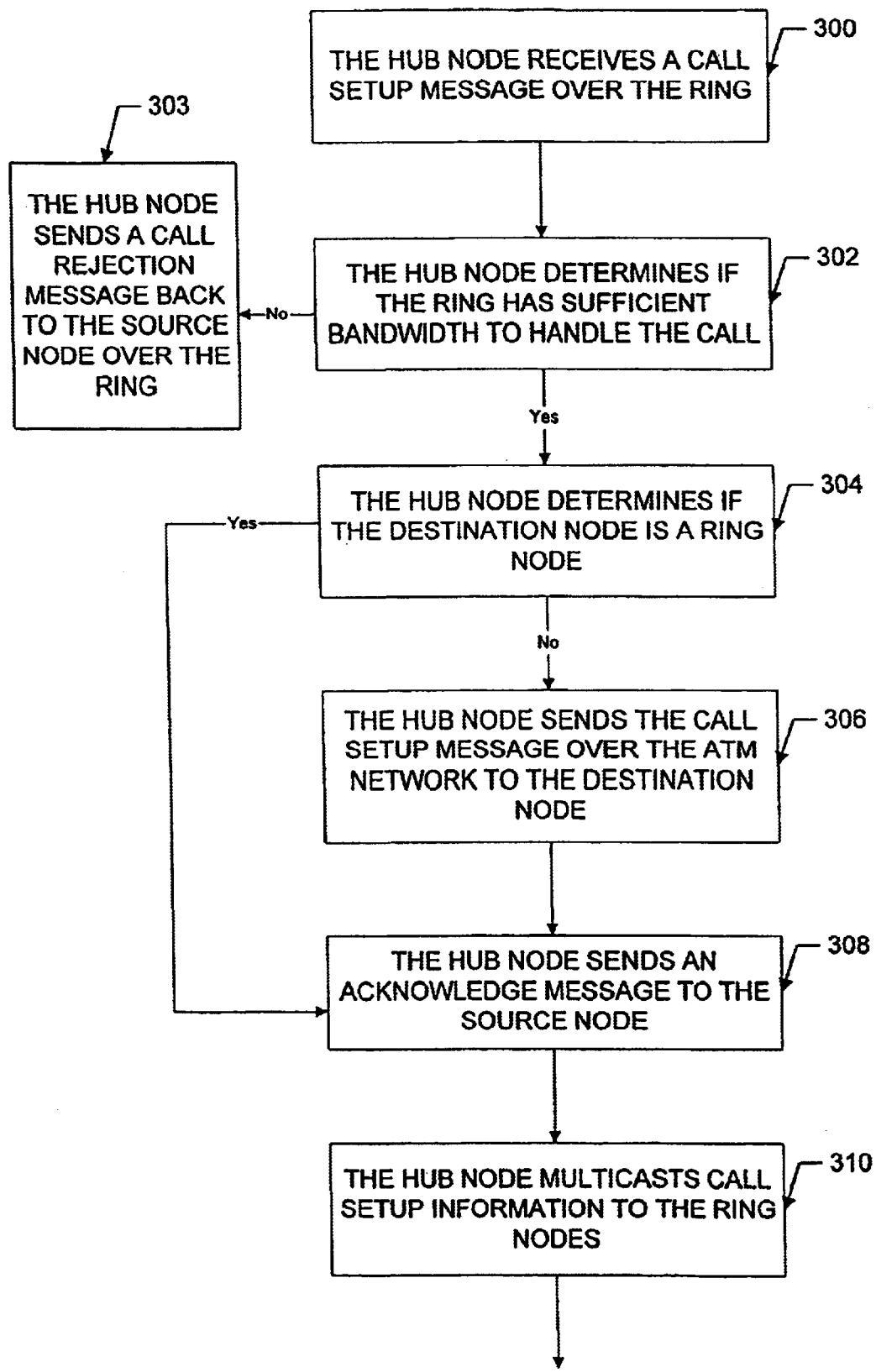
FIG. 3 is a flowchart of the operations of the system in setting up a call from a source station that is connected to the ring.
Figure 3B:
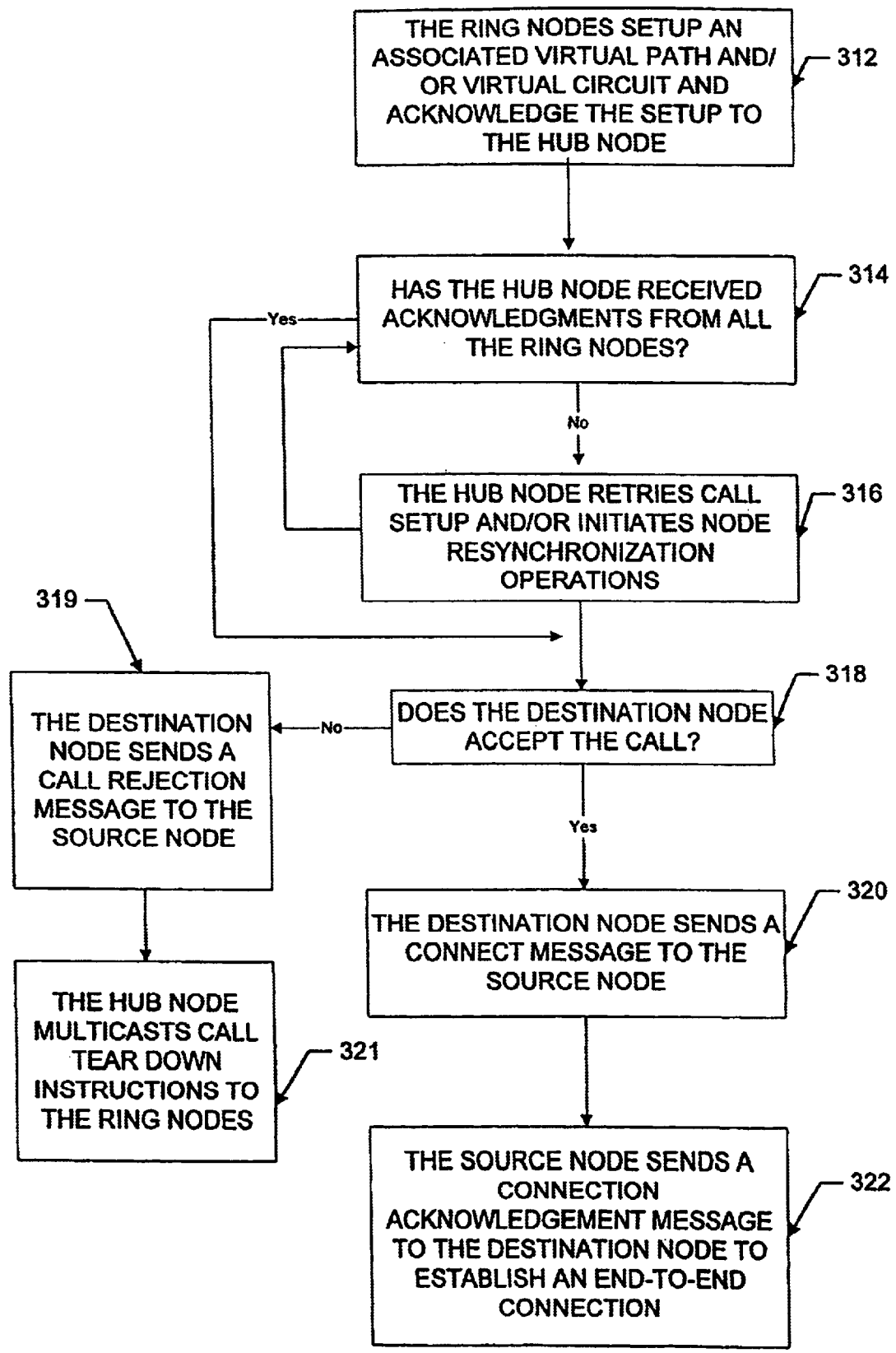

Referring now to FIGS. 1 and 3, when a source station 26 that is connected to one of the ring nodes 12 initiates a call, the node sends a call setup message over the ring to the hub node 12' (step 300). In response to the message, the hub node determines if there is sufficient bandwidth on the ring to support the call (step 302). If there is sufficient bandwidth, the hub node sends an acknowledgement message to the source node (step 304). The hub node next determines if the intended destination node is connected to the ring (step 306).

If the destination node is not connected to the ring, the hub node forwards the call setup message through the UNI 28 and over the ATM network to a next node on a route to the destination node (steps 306, 308). The hub node 12' also multicasts call set up information to the ring nodes 12, and directs them to set up the appropriate virtual circuit and/or virtual path connections over the ring (step 310).

In response, the ring nodes 12 simultaneously set up the call, and each node sends back to the hub node a message acknowledging that the associated virtual path and/or virtual circuit has been established (step 312). If the hub node does not receive acknowledgment messages from all of the ring nodes, the hub may retry the call setup and/or initiate ring protection switching (steps 314, 316).

Preferably, the hub node 12' keeps track of which ring nodes 12 have not returned messages that acknowledge the set up of the virtual circuit and/or virtual path, and also, those nodes that have not responded to call setup instructions for other calls then being set up on the ring. The hub node may, at predetermined times after the multicast, retry the call setup by again sending the setup instructions. After a predetermined number of retries, the hub node determines that a particular ring interface on a given, non-responding node is down and the hub node then attempts to resynchronize the non-responsive node by, for example, re-loading call configuration information. Alternatively, the hub node may attempt to resynchronize the node without retrying the call setup, if the node has not responded to the call setup instructions for the other calls.

If the call is later rejected by a network node or the intended destination node, the hub node 12' receives a call rejection message over the UNI 28. The hub node 12' then forwards the call rejection message to the source node and directs the ring nodes 12 to tear down the associated virtual circuit and, as appropriate, the virtual path (steps 321, 323). Otherwise, if the call is accepted, the hub node 12 routes a connect message from the network to the source node, and returns a connection acknowledgment message to the destination node. The ring nodes 12 then participate in the end-to-end connection.

When both the source node and the destination node are connected to the ring, the hub node 12' uses the ring call administration protocol to simultaneously direct the ring nodes 12 to set up an associated virtual path and/or virtual circuit over the ring (step 310). The hub node also forwards the call setup message from the source node to the destination node (steps 308). If the destination node ultimately rejects the call, the node sends a call rejection message over the ring. In response, the hub node directs the ring nodes to tear down the associated virtual circuit and/or virtual path (steps 321, 323). Otherwise, the destination station returns a connect message to the source station, and the ring nodes provide the end-to-end connection.

In brief summary, the hub node 12' in the system 10 communicates with an ATM network and simultaneously provides call setup information to all of the nodes on the ring. In the time it takes to include the hub node 12' and an end node 12 in a connection, the system 10 has also included all of the ring nodes 12 in the connection. The system 10 thus reduces the time it takes to set up a connection that includes the ring nodes 12.

The foregoing description has been limited to a specific embodiment of this invention. It will be apparent, however, that variations and modifications may be made to the invention, such as, the inclusion of special call setup instructions for the destination node in the call setup instructions that are multicast to the ring nodes, and/or the use of is the methods described herein in a SONET ring or in any network with predefined primary and secondary routes between a sub-network of nodes, with the attainment of some or all of its advantages. Therefore, it is the object of the appended claims to cover all such variations and modifications as come within the true spirit and scope of the invention.

What is claimed is:

1. A method for establishing over a multiple-node network a connection which includes an end node that is part of a ring having a plurality of ring nodes, the method including, for a call that originates at a source node that is one of the ring nodes, the steps of:
   i. sending a call setup message to a hub node on the ring that controls ring operations;
   ii. determining at the hub node if the ring has sufficient bandwidth available for the call;
   iii. if the ring has sufficient available bandwidth, multicasting call setup information from the hub node to at least one non-destination node on the ring;
   iv. if the ring does not have sufficient available bandwidth sending a call rejection message from the hub node to the source station.

2. The method of claim 1, further including the steps of:
   v. if a call is rejected by a destination node, receiving at the hub node a call rejection message from the destination node;
   vi. sending from the hub node to the ring nodes an instruction to tear down the call; and
   vii. forwarding the call rejection message from the hub node to the source node.

3. The method of claim 1, further including the steps of:
   v. if a call is accepted by a destination node, receiving at the hub node a connect message from the destination node;
   vi. forwarding the connect message from the hub node to the source node; and
   vii. returning a connection acknowledgment message from the source node to the destination node.

4. The method of claim 1 wherein the step of multicasting the call setup information to the ring nodes further includes each ring node simultaneously setting up a virtual circuit for the call.

5. The method of claim 4 wherein the step of multicasting the call setup information to the ring nodes further includes the ring nodes simultaneously setting up a virtual path for the call.

6. The method of claim 4 wherein the step of multicasting the call set up information further includes the ring nodes each sending to the hub node an acknowledgment of the set up virtual circuit.

7. The method of claim 6 further including a step of retrying a call setup if all of the ring nodes do not acknowledge the setup of the virtual circuit.

8. The method of claim 6 further including a step of resynchronizing the nodes that do not acknowledge the call set up instructions.

9. A method for establishing over a multiple-node network a connection which includes an end station that is part of a ring having a plurality of ring nodes, the method including, for a call that has a destination node that is one of the ring nodes, the steps of:
   i. receiving over the network at a hub node on the ring that controls ring operations a call setup message from a source node;
   ii. determining at the hub node if the ring has sufficient bandwidth available for the call;
   iii. if the ring does not have sufficient available bandwidth for the call, sending a rejection message from the hub node to the source node;
   iv. if the ring has sufficient available bandwidth sending an acknowledgment message from the hub node to the printer node on the route from the source node, and multicasting call setup information from the hub node to at least one non-destination node on the ring;
   v. if the destination node accepts the call, sending a connect message from the destination node to the source node and a connection acknowledgment message from the source node to the destination node;
   vi. if the destination node rejects the call, sending a rejection message from the destination node to the source node, and sending from the hub node to the ring nodes call tar down instructions.

10. The method of claim 9 wherein the hub node further forwards the call setup message to the destination node if the ring has sufficient bandwidth.

11. The method of claim 9 wherein the step of multicasting the call setup information to the ring nodes further includes the ring nodes simultaneously setting up a virtual circuit for the call.

12. The method of claim 11 wherein the step of multicasting the call setup information to the ring nodes further includes each ring node simultaneously setting up a virtual path for the call.

13. A ring for providing communication paths for calls between end stations connected to the ring and end stations connected to nodes of a multiple-node network, the ring including:
   A. a plurality of ring nodes;
   B. an interface between the ring and the network for communicating messages to and from nodes on the ring and the network;
   C. a hub node for controlling ring operations, the hub node including
      i. means for receiving a call setup message from a source node,
      ii. means for determining if sufficient bandwidth is available on the ring for a call,
      iii. means for forwarding the call setup message to the destination node, and
      iv. means for multicasting call setup information to at least one non-destination node on the ring to simultaneously establish a virtual circuit in response to the call setup message.

14. The ring of claim 13 wherein the means for directing further directs the ring nodes to set up a virtual path.

15. The ring of claim 14 wherein
   a. the means for receiving further receives call rejection messages, and
   b. the means for directing further simultaneously directs the ring nodes to tear down the virtual circuit.

16. The ring of claim 15 wherein the means for directing simultaneously directs the ring nodes to tear down the virtual path.

17. The ring of claim 13 wherein the hub node further includes means for returning an acknowledgment message to the node that forwarded the call setup message to the ring.

18. The ring of claim 13 wherein the ring nodes send acknowledgment messages to the hub node, to acknowledge that the virtual circuit has been established.

19. The ring of claim 18 wherein the means for directing the nodes to establish a virtual circuit further directs the ring nodes to try again to establish the virtual circuit if all of the ring nodes have not acknowledged the set up of the virtual circuit.

20. The ring of claim 18 wherein the hub node further includes means for resynchronizing the nodes that do not acknowledge the set up of the virtual circuit.

21. The ring of claim 19 wherein the hub further includes means for resynchronizing the nodes have not acknowledged the set up of the virtual circuit after a predetermined number of retries.

22. The method of claim 1 wherein the hub node further forwards the call setup message to the destination node if the ring has sufficient bandwidth.

23. The method of claim 1, wherein the call setup information is multicast to all nodes on the ring.

24. The method of claim 9, wherein the call setup information is multicast to all nodes on the ring.

25. The ring of claim 13, wherein the means for multicasting multicasts the call setup information to all nodes on the ring.

* * * * *